United States Patent
Schäfer et al.

(10) Patent No.: US 6,993,155 B1
(45) Date of Patent: Jan. 31, 2006

(54) METHOD FOR READING DOCUMENT ENTRIES AND ADDRESSES

(75) Inventors: Hartmut Schäfer, Constance (DE); Thomas Bayer, Radolfzell (DE)

(73) Assignee: Siemens AG, München (DE)

( * ) Notice: Subject to any disclaimer, the term of this patent is extended or adjusted under 35 U.S.C. 154(b) by 0 days.

(21) Appl. No.: 09/913,278

(22) PCT Filed: Feb. 1, 2000

(86) PCT No.: PCT/DE00/00269

§ 371 (c)(1),
(2), (4) Date: Nov. 1, 2001

(87) PCT Pub. No.: WO00/48119

PCT Pub. Date: Aug. 17, 2000

(30) Foreign Application Priority Data

Feb. 12, 1999 (DE) ............................ 199 05 938

(51) Int. Cl.
*G06K 9/00* (2006.01)

(52) U.S. Cl. ...................... 382/101; 382/102
(58) Field of Classification Search ............. 382/101, 382/102, 173, 175, 176–177, 181, 190, 224–229
See application file for complete search history.

(56) References Cited

U.S. PATENT DOCUMENTS

| | | | |
|---|---|---|---|
| 4,516,264 A * | 5/1985 | Corvari et al. | 382/101 |
| 4,724,542 A | 2/1988 | Williford | |
| 5,031,223 A * | 7/1991 | Rosenbaum et al. | 382/101 |
| 5,159,667 A | 10/1992 | Borrey et al. | |
| 5,697,504 A * | 12/1997 | Hiramatsu et al. | 209/546 |
| 5,754,671 A * | 5/1998 | Higgins et al. | 382/101 |
| 6,470,091 B2 * | 10/2002 | Koga et al. | 382/101 |
| 6,587,572 B1 * | 7/2003 | Suchenwirth-Bauersachs et al. | 382/101 |
| 2001/0040981 A1 * | 11/2001 | Foley | 382/101 |

OTHER PUBLICATIONS

Rabiner, Lawrence R.: "A Tutorial on Hidden Markov Models and selected Applications in Speech Recognition", IEEE, vol. 77, No. 2, Feb. 1998.

Press, Will H. et al.: Numerical Reciped in C, Chapter 10, "Minimization or Maximization of Functions", Cambridge University Press, 1992 pp. 394-454.

* cited by examiner

*Primary Examiner*—Samir Ahmed
*Assistant Examiner*—Brian Le
(74) *Attorney, Agent, or Firm*—Siemens AG; Jacob Eisenberg

(57) ABSTRACT

The invention relates to a method for reading document entries and addresses. In this context, automatic reading is effected using the intermediate steps of layout analysis, classification of the segmented regions and interpretation of the results in a reader, and if necessary video coding. According to the invention, during the reading mode, when information has been clearly read automatically, the image data and the associated reading results and intermediate results, and/or, when information has been clearly ascertained using video coding, the image data and the reading results and intermediate results clearly ascertained in a second automatic reading process including the video coding results are stored for a current random sample. This current random sample is used to readapt the automatic reader.

16 Claims, 4 Drawing Sheets

METHOD FOR READING DOCUMENT ENTRIES AND ADDRESSES

BACKGROUND OF THE INVENTION

The invention relates to a method for reading document entries and addresses.

Reading systems have the task of converting text parts, which may also contain numbers, on a document or a dispatch into the equivalent electronic text within a specific application context, and of deriving the specific information which is important in this application. Examples of reading systems are address readers, whose task is to recognize the characters and numbers from the text parts on postal dispatches, such as letters or packages, specifically from the area of the recipient address, and to derive the distribution code from the set of characters and numbers.

For this purpose, a range of recognition methods are used which, once the document or dispatch has been scanned, convert the resultant electronic image into electronic text step by step. The substeps are, specifically, layout analysis (recognition of document type, determination of the regions of interest (ROI), segmentation of the text image into lines, words and/or characters, character classification or recognition of joined-up handwriting, and finally interpretation of the text parts. Each recognition step has a defined parameter set which determines how the subsidiary recognition object is achieved.

To achieve a prescribed reading object, a reading system's recognition steps, and hence the reading system itself, are adapted to the specific characteristics of said reading object in order to attain the best possible reading result. To this end, example documents and dispatches are composed (random samples) which best describe the requirements of the reading object. Each document is provided with the correct solution (label) in the form of the text which is to be extracted, so that a database of pairs of document images and the desired result (label) is built up. This desired result also includes the results of the reading substeps.

On the basis of the prior art, the parameters of the individual recognition steps are set before the actual reading mode such that the reading object, represented by the labeled random sample, is achieved as well as possible. This process, called adaptation, is iterative.

The 3 steps below are cycled through until the recognition performance is satisfactory:
a parameter setting is chosen, the reading system is tested using the random sample images, the results are evaluated using the desired results or labels provided.

Following adaptation, the reading system has been optimized for processing the elements of the random sample. The composition of the random sample therefore determines to a high degree the recognition performance of the reading system, particularly since the parameter configuration ascertained for the recognition steps during operation is retained for each reading system delivered. Since it is not possible to foresee the actual distribution of the documents to be read for a specific site, the reading system is not optimally adapted to the reading object at a specific location. In particular, local peculiarities and changes in the distribution of the material being read over time cannot be taken into account by the reading system.

Reading systems currently in use do not have the characteristic that they use the documents currently being processed to adapt themselves dynamically to the existing characteristics during operation. The individual recognition steps are always adapted once to prescribed static random samples in advance, as described, and the parameter sets derived therefrom are kept constant in the application. For this purpose, there are a multiplicity of character recognition methods which are adapted to the object to be achieved using a prescribed labeled learning random sample. [Schürmann, Jürgen: Pattern Classification, Wiley Interscience, 1996]. Adaptation algorithms are likewise known for methods for recognizing joined-up handwriting [Rabiner, Lawrence R.: A Tutorial on Hidden Markov Models and Selected Applications in Speech Recognition Proceedings of the IEEE, Vol. 77, No. 2, February 1989], as there are for the classification of formula types. Besides these optimization approaches which solve a classification problem, methods are known which optimize the parameters by "specific experimentation", such as evolutionary algorithms, simulated annealing or the like [Rumelhart, D. E. et al.: Learning Internal Representation by Error Propagation, Parallel Distributed Processing, Vol. 1, MIT Press, Cambridge, Mass., 1986/Press, Will H. et al.: Numerical Reciped in C, Chapter 10, Minimization or Maximization of Functions, Cambridge University Press, 1992]. Applications for this purpose are topology optimization in neural networks used for character classification, for example. When using these methods, however, a previously defined random sample is always used from which the optimized parameter sets are calculated, which are not altered again in the application.

SUMMARY OF THE INVENTION

The invention specified in claim 1 is based on the object of providing a method for reading document entries and addresses which permits automatic adaptation of the automatic reader to current conditions and compositions of the material being read.

The invention is based on the concept of not just adapting the automatic reader, as previously, in an upstream phase using a selected random sample, but rather generating a new random sample or updating the original random sample during the reading mode in progress, and setting the parameters of the reader again automatically using this random sample. This constantly and automatically adjusts the reader to different local characteristics of the material being read or to a changing material composition. To generate current random sample parts, when information from images of selected material being read has been clearly read automatically, the reading results and intermediate results associated with the image data are stored. If the information required has been ascertained using video coding because a clear result was not obtained using the automatic reader, the image is automatically read once again in a second reading phase and the result of the video coding is included. If this second reading can be concluded with a clear reading result, the reading results and intermediate results now obtained are assigned to the associated image data and are likewise stored for the current random sample.

If the second reading operation is not successful, this image of the material surface to be read is not included in the random sample with the results. The current random sample is then used to readapt the automatic reader.

Advantageous refinements of the invention are illustrated in the subclaims.

Thus, it is advantageous to carry out the second reading operation with no time limitations. This means that images which were rejected in the first reader only on account of the time limit being exceeded can be successfully read and included in the random sample. Images which could result in instances of incorrect adaptation on account of inconsistencies, e.g. owing to incorrect inputs during video coding or owing to instances of incorrect addressing, are advantageously not adopted in the random sample.

To reduce the adaptation complexity, it is beneficial if, for each image read successfully using video coding, the intermediate results for the first automatic reading are compared with the intermediate results for the second automatic reading, and significant discrepancies are statistically recorded as evaluation errors in the intermediate steps during the first automatic reading. Then, only the intermediate steps whose frequency of error is above a stipulated value during a particular time period are readapted.

It is also advantageous to monitor the reading rate for the first automatic reading. Only if this reading rate is below a threshold value over a stipulated time period are the reader or the intermediate steps readapted using the current random sample.

In another advantageous refinement, a random sample is used to ascertain the reading rate on an automatic reader having the same functionality in the case of the previous and the readapted parameters. Only if the readapted parameters achieve an improvement is the automatic reader reinitialized. This ensures that reinitialization operations are carried out only to the necessary degree in the event of improvements.

Whether each newly read image with clearly read information or just each x-th image is included in the random sample depends on how much material to be read there is, how many images the random sample is meant to comprise and how great the alterations affecting the reading results are in the images.

It is also beneficial if the random sample is composed only of automatically read and video coded images in the stipulated ratio. This ensures that the critical instances having a particular effect on readaptation are taken into account to a sufficient extent with video coding. The readaptation can be carried out both using updated random samples, where the old elements are replaced by new elements, and using new random samples. The selection depends on the specific conditions, such as the amount of material per unit time, speed at which the reading rate alters.

BRIEF DESCRIPTION OF THE DRAWINGS

The invention is explained in more detail below using an exemplary embodiment for address reading with reference to the drawing, in which.

DETAILED DESCRIPTION OF THE INVENTION

Figure 1:
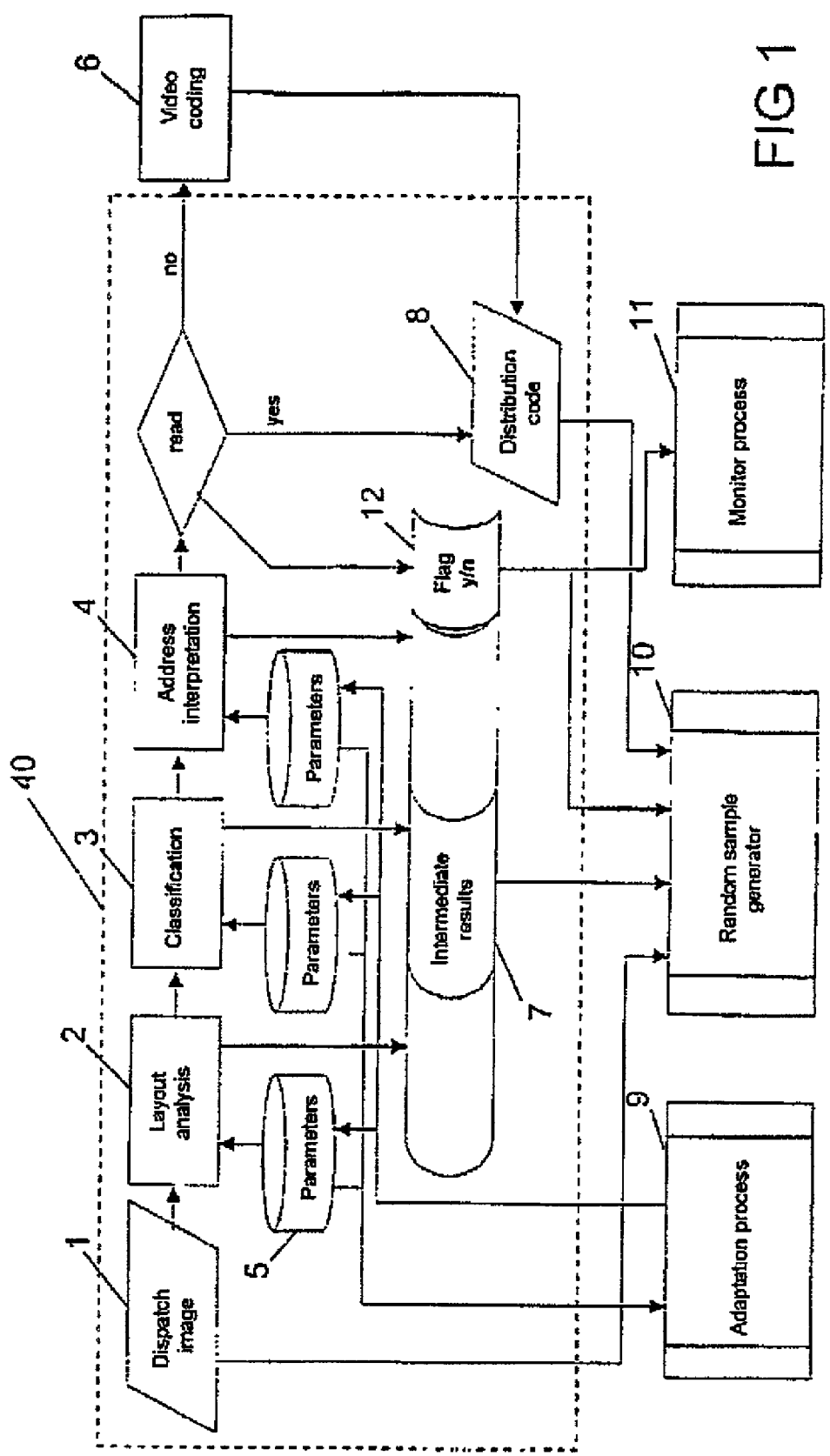
FIG. 1 shows a block structure for the reader with interfaces for the adaptation process, monitor process and random sample generator.

During address reading, the task of the reader 40 shown in FIG. 1 is to find the address on a dispatch image 1, to decode the characters in the address and to extract the information relevant for sorting from the address. If the reader 40 is not able to ascertain the distribution information automatically (rejection), the image 1 of the dispatch is sent to a video coding station 6, where a worker enters these data manually, for example the postcode.

The relevant information for the distribution object usually comprises the postcode, the town, the road and house number and in some cases the name and first name of the addressee. Which parts of the address are relevant for sorting is defined by the specific application.

The reader 40 is divided into the method parts of layout analysis 2 (document type recognition, ROI localization, segmentation), recognition of individual characters and joined-up handwriting 3, and address interpretation 4. To achieve a reading object, these method parts are executed sequentially.

Each method part has an application-specific parameter set 5 which has been ascertained from an adaptation using a prescribed random sample, which usually comprises several thousand dispatches. After this adaptation, the reading system is used throughout the country in the postal distribution centers. The dispatches received there on a daily basis may differ considerably from the dispatches which have been used to optimize the system; in addition, dispatch characteristics may change significantly over time such that the reading system then operates only below the optimum level.

The described method constantly and automatically optimizes the reader 40 to the spatial peculiarities of the address reading object and to possible alterations over time; this compensates for the weaknesses of previous "static" address readers. The point of departure is the reader $L_0$, characterized by the output parameters $P_0$ at the instant $T=t_0$. As time progresses, the parameter sets are readapted as required, and incarnations of new readers are produced. The reading rates of a readapted reading system $L_i$ and of the precursor system $L_{i-1}$ are ascertained using a verification random sample. $L_i$ is used only in the event of improvement, otherwise it is the previous reader.

Figure 2:
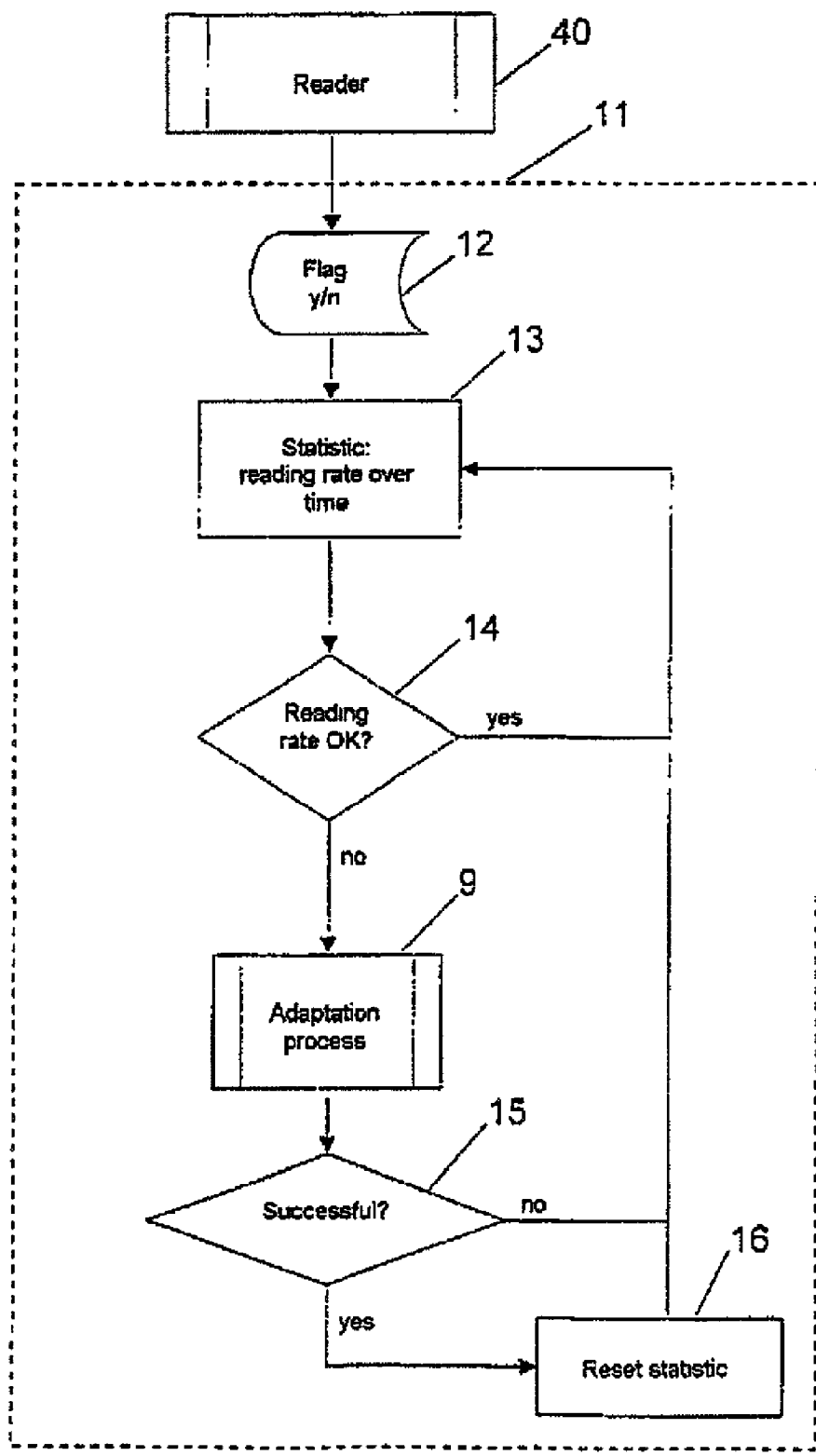
FIG. 2 shows a flow structure for the monitor process.
Figure 3:
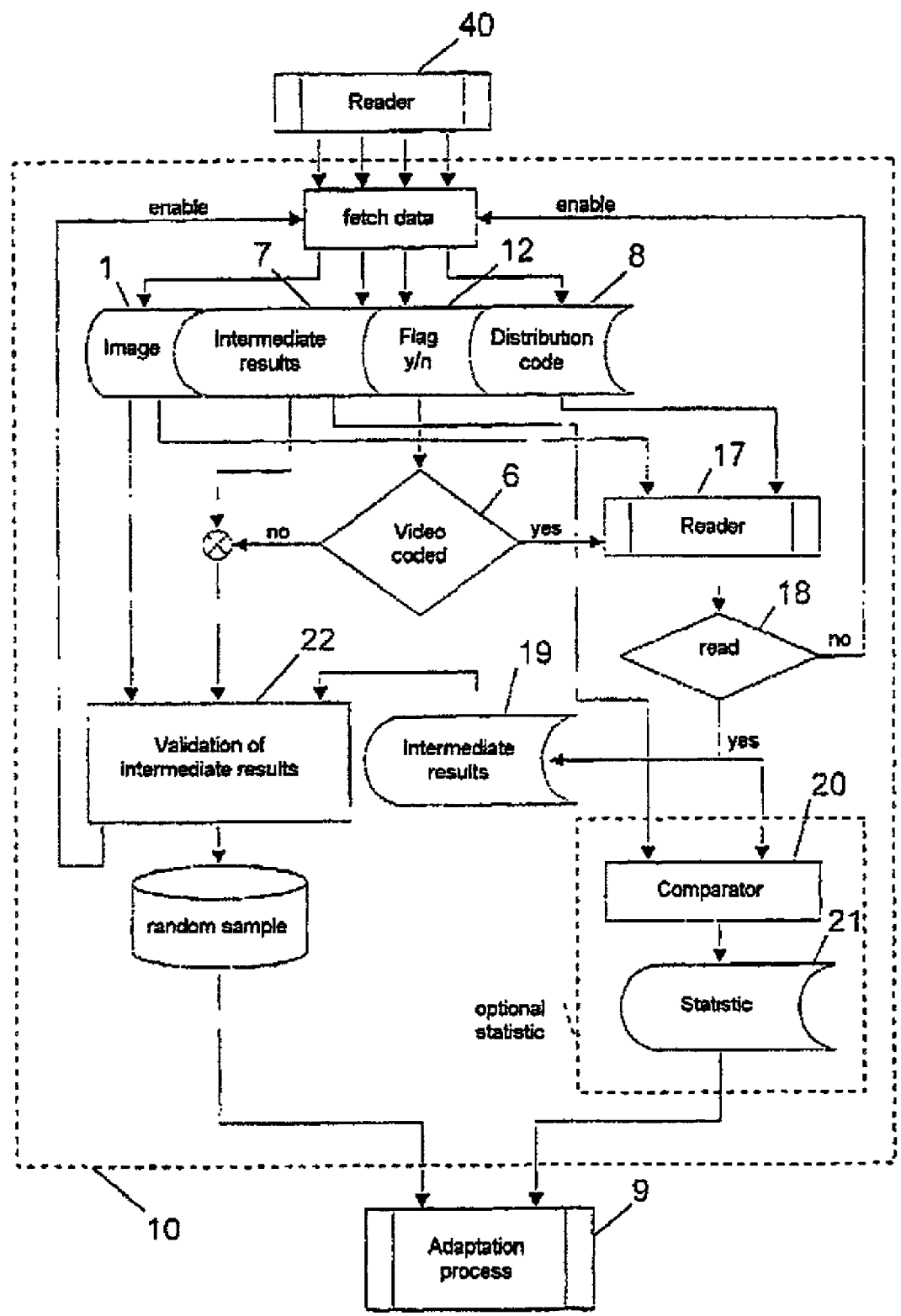
FIG. 3 shows a flow structure for the random sample generator.
Figure 4:
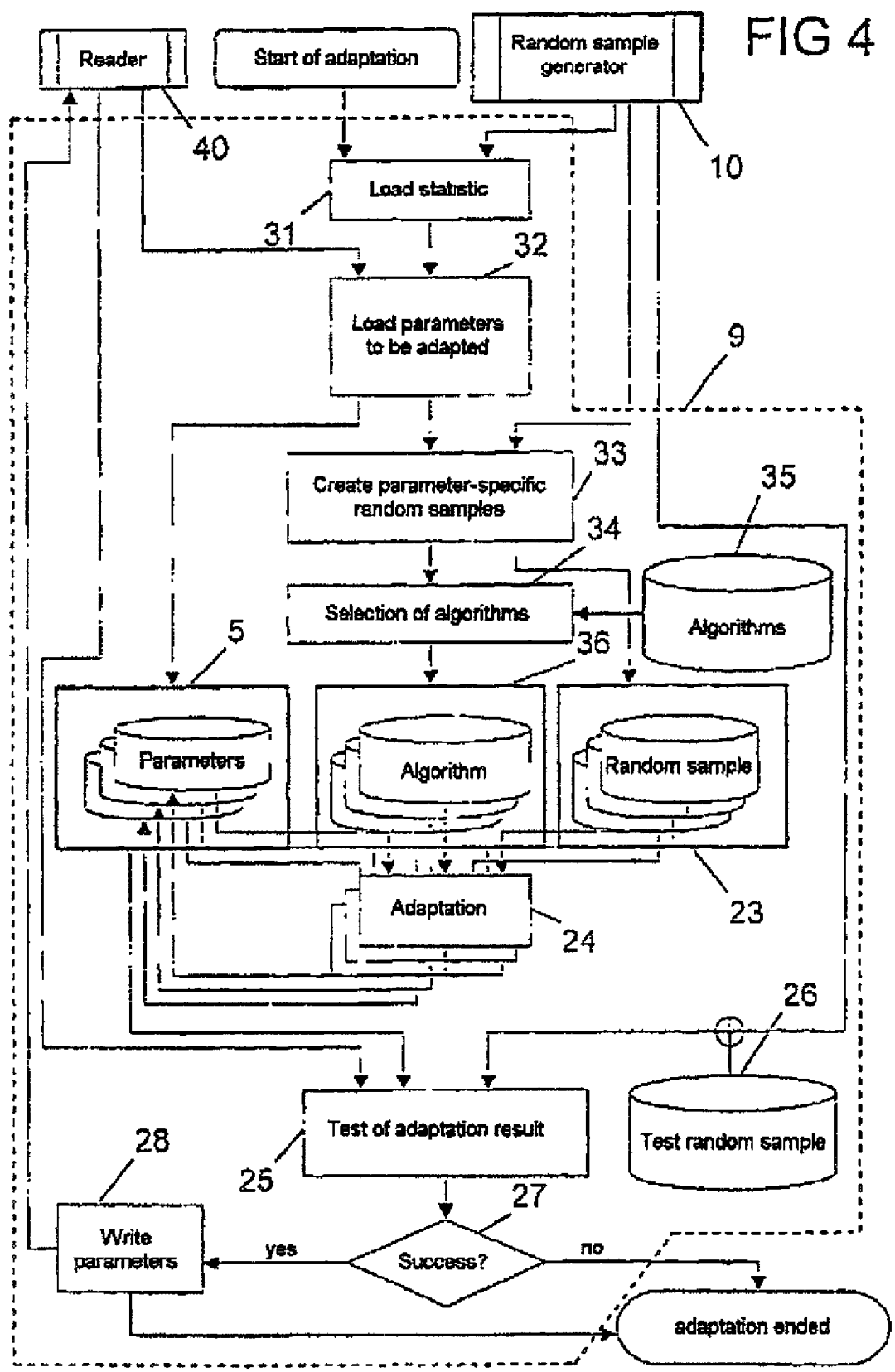
FIG. 4 shows a flow structure for the adaptation process.

The method comprises the inherently known reader 40 (FIG. 1), a monitor process 11 (FIG. 2), a random sample generator 10 (FIG. 3) and an adaptation process 9 (FIG. 4).

As already described in the prior art, the reader 40 implements the method steps of layout analysis 2, classification 3 and address interpretation 4. The input into the reader 40 comprises the image 1 of a dispatch 1, which image is analyzed over the method steps with the aim of deriving the distribution code 8 from the information relevant for distribution. To this end, the dispatch image 1 is broken down into information-containing areas and irrelevant areas during the layout analysis 2. The information-containing areas are additionally broken down into their smallest information-containing units. In the case of block capitals, these are the individual characters, and are words in the case of joined-up script. These units are classified 3 using appropriate classifiers, and the classification results are assigned to the areas. All the areas with their identifying features (geometry, position, orientation, classification results) are stored in a memory situated outside the module. From these intermediate results 7, the address interpretation stage 4 ascertains the most likely entry from the dictionary which contains all valid addresses and is part of the parameter set of the address interpretation stage 4. For the dictionary entry found, the distribution code is read from a table and is transferred, by way of example, to a machine controller for a sorting machine, which then ensures that the dispatch ends up in the correct sorting compartment. If no likely dictionary entry can be found, the dispatch image 1 is passed to the video coding stage 6, where a person enters the information relevant to distribution into the system. The machine controller is situated outside the reader 40 and is not shown in the figures.

The monitor process 11 has the task of ascertaining 13 a reading rate over time, and, to this end, the reader 40 uses a flag 12 to notify the monitor process of whether or not it has been possible to read the processed dispatch automatically. The monitor process monitors the reading rate constantly 14, initiates an adaptation process 9 if there is a significant drop in the reading rate, and waits until said adaptation process is ended. When the adaptation process 9 is ended, it notifies the monitor process of whether or not adaptation was successful 15. Adaptation is successful if it achieves an improvement in the reader 40. In the event of successful adaptation, the statistic is reset 16, i.e. calculation of the reading rate is started again. The start value used is the reading rate reached by the adapted system on the test random sample. After successful adaptation or after resetting of the statistic, observation of the reading rate is continued.

The random sample generator 10 is shown in FIG. 3 and forms one of the new core modules. Its task is to generate random samples suitable for adapting the reader 40 from the reading results of the reader 40, from the dispatch image 1 and, if appropriate, from the video coding input 6. To be able to perform this task, the random sample generator 10 is able to read from the reader 40 the dispatch image 1, the intermediate results 7, the flag 12 indicating whether or not the dispatch has been video coded and the distribution code 8.

As a first step, a check is carried out to determine whether or not the dispatch currently to be processed has been video coded 6. In the case of video coded dispatches, the intermediate results are incomplete or incorrect. However, since they are used to generate the random sample, and errors, in particular, are the most revealing, these dispatch images have particularly high standing. It is therefore worthwhile producing the complete intermediate results even if it takes a relatively large amount of effort. The more intermediate results can be produced from video coded dispatches, the greater the improvements which can be expected from an adaptation. The intermediate results from video coded dispatches are calculated by a further reader 17 having the same functionality. The difference is primarily a dictionary which is restricted by the distribution code from video coding. Optionally, this reader 17 may also be set such that it searches the entire search area for the correct solution by removing the limitations, above all for the running time per dispatch. This permits the reader 17 to automatically read many dispatches which it was previously unable to read.

If, despite video coding, a dispatch cannot be read automatically the second time 18, it is discarded for the current random sample or is collected in a problem random sample, and the random sample generator 10 fetches the next dispatch. Optionally, however, a more extensive video coding dialogue may be incorporated, in which each intermediate step can be video coded by one person. It is then possible for the intermediate results to be produced from even more dispatches, and hence an even greater improvement can be expected during adaptation. Such a video coding dialogue is not always appropriate for reasons of cost, however.

The intermediate results 19 produced can now be compared with the intermediate results 7 from the reading system. In this context, the results of the intermediate steps are compared with one another (20) in the order of the method. Upon the first significant discrepancy between the results, it is possible to conclude from this that the corresponding system module has made an error. This comparison also reveals which early errors affect subsequent system modules and to what extent. This statistic 21 provides important indications of system weak points. Irrespective of whether the complete intermediate results have been produced by the second reader 17 or originate from the reader 40, they enter a validation process 22 before being included in the random sample 23. This process has the task of selecting from the intermediate results those alternatives corresponding to the printing on the dispatch as the desired result. This step is required because the address interpretation stage is tolerant of error as it operates and, by way of example, makes compensation for typing errors in the address, incorrect classification results on individual characters, etc., and still finds the correct address. If, by way of example, a letter bears the address "78467 Komstanz", it is possible to conclude from the postcode and the proximity of m to n and also from the fact that the other letters match with Konstanz that this is a letter to Konstanz. Thus, the m from Komstanz must under no circumstances be assigned the desired result n for the individual character classification, even though the desired identifier for the address interpretation is Konstanz. Since the automatic validation method cannot be given any human help, there is no absolute certainty about the actually correct characters on the letter. To prevent incorrect desired results, the desired result of the address interpretation is adopted, with the exception of those points at which the upstream intermediate steps differ greatly from the desired result. There, a distinction is drawn between three cases:

1. In the first case, the upstream intermediate step will most certainly recommend another result. In this case, the result of the intermediate step is adopted as the desired result for this intermediate step.
2. In the second case, the upstream intermediate step supplies a list of alternatives, and the desired result of the address interpretation is contained in this list. The desired result of the address interpretation is then adopted as the desired result for this intermediate step.
3. The third case corresponds to the second case, with the exception that the desired result of the address interpretation is not contained in the list of alternatives. In this case, a desired result is not generated for this intermediate step in order to prevent an incorrect desired result.

The images and intermediate results 22 validated in this manner are stored in the random sample 23. The random sample contains reading results and intermediate results associated with the image data and may be organized in various ways:

1. The random sample contains a collection of intermediate results.
2. The random sample contains a respective file for the intermediate steps, i.e. the intermediate results for the reader 40 are broken down into the intermediate results of the individual intermediate steps.
3. Irrespective of 1. and 2., the random sample is split into the two cases "read automatically" and "video coded".
4. Irrespective of 1. to 3., the possible size of the random sample is limited. If the maximum size has been reached, the oldest random sample elements are therefore overwritten with new ones.

The organization form decided upon depends on the aims pursued with the random sample, and on the way in which the adaptation process accesses the random sample.

FIG. 4 shows the adaptation process 9 as initiated by the monitor process 11. It first attempts to load 31 the statistic from the random sample generator. If this can be done, then it is possible, for efficiency reasons, to limit the choice of intermediate steps to be adapted to those which have contributed most to any rejection and are thus the weakest elements in the processing chain. This means that any improvement in these modules results in the greatest improvement in the reading system. If no statistic can be loaded, then all the intermediate steps are adapted.

Next, the parameters 5 for the modules to be adapted are loaded 32 from the reading system and are stored for the adaptation process. The random samples specific to intermediate steps or the random samples specific to parameters are then created 33 from the random sample in the random sample generator. This step can profit from a suitable random sample organization in the random sample generator 10. In the next step, the adaptation algorithms 35 are selected 34 from an algorithm collection. Besides the actual algorithms, this collection stores prerequisites for the random sample, running time, memory requirement etc.

If all the prerequisites are satisfied, the random sample for the parameter set can be readjusted, or an order of adaptation among the parameters can be calculated.

In the next step, the adaptation operations 24 for the individual parameters 5 are started using the chosen respective algorithm 36 and the random sample 23 produced, and the adaptation result obtained is tested 25. This requires a test random sample 26 which either always remains the same and was delivered with the system or else has been produced by the random sample generator 10. This test random sample 26 is processed once by a reader using the configuration before adaptation and once using the configuration after adaptation, and the reading results are compared 25. If the adapted reader is better, the parameters are written 28 to the reader 40, where they are loaded upon the next initialization. The adaptation process 9 is then ended and indicates back to the monitor process 11 whether or not adaptation was successful.

The method illustrated can also be used particularly advantageously for large customers, dispatches to be read which are delivered in stacks. The addresses to be read have high degrees of commonality, e.g. uniform appearance of writing, identical local arrangements on the dispatch. If each dispatch read is included in the random sample, then changes in the dispatch and image characteristics can immediately change the parameters.

What is claimed is:

1. A method for reading document entries and addresses using the following method steps
   an image of the surface of documents or dispatches which contains the information to be read is recorded,
   the information is automatically read in a reading mode in a reader using the following intermediate steps
   layout analysis with
   determination of the regions (ROI) which contain the information to be read,
   segmentation into the areas which are to be classified,
   classification of the segmented regions,
   interpretation of the results from the preceding steps,
   with intermediate results being stored, such that they can be picked off for subsequent intermediate steps, until a new image is read,
   the image in question is video coded if a clear reading result has not been automatically ascertained within a prescribed time period,
   the automatic reading steps being optimized in an adaptation phase using a random sample, comprising the images with the information to be read and the associated nominal reading results with their intermediate results,
wherein, during the reading mode, when information from selected images has been clearly read automatically, the reading results and intermediate results associated with the image data of the respective image are stored for a current random sample, and/or, when information from the selected images has been clearly ascertained using video coding, the image data are read once again in a second automatic reading process, having the same functionality, and the associated information ascertained by video coding is included, and in the case of a clear reading result, the reading results and intermediate results are likewise stored, assigned to the associated image data, for the current random sample, and in that the current random sample is used to readapt the automatic reader and the images to be included in the random sample are selected such that the random sample contains a stipulated ratio of automatically read images and video coded images.

2. The method according to claim 1, wherein the reading process for the second automatic reading is carried out with no time limitations.

3. The method according to claim 1, further comprising the steps of determining unsuitable reading and intermediate results and excluding such results from the random sample.

4. The method according to claim 1, wherein, for each image read successfully using video coding, the intermediate results for the first automatic reading are compared with the associated intermediate results for the second automatic reading, and significant discrepancies are summed as evaluation errors in the respective intermediate steps during the first automatic reading to form a statistic.

5. The method according to claim 4, wherein only the intermediate steps whose ascertained frequency of error is above a stipulated value during a particular tine period are readapted.

6. The method according to claim 1, wherein the reading rate for the first automatic reading is monitored, and if the reading rate is below a particular threshold value over a stipulated time period, the reader or the intermediate steps are readapted using the current random sample.

7. The method according to claim 1 wherein the reading rate is ascertained on an automatic reader having the same functionality using a random sample in the case of the previous and the readapted parameters, and if the reading rate is improved by the readapted parameters, the automatic reader is reinitialized.

8. The method according to claim 1, wherein the images to be included in the random sample are selected such that the random sample contains a particular number of newly read images having clearly read information within a stipulated time period.

9. The method according to claim 1, wherein the random sample data for the selected, currently read images are inserted into the original random sample, and if a maximum number of random sample elements is exceeded, the oldest elements in each case are removed.

10. The method according to claim 1, wherein the original random sample is replaced by a current random sample.

11. A method for reading document entries and addresses using the following method steps
   an image of the surface of documents or dispatches which contains the information to be read is recorded,
   the information is automatically read in a reader using the following intermediate steps
   layout analysis with
   determination of the regions (ROI) which contain the information to be read,
   segmentation into the areas which are to be classified,
   classification of the segmented regions,
   interpretation of the results from the preceding steps, with intermediate results being stored, such that they can be picked off for subsequent intermediate steps, until a new image is read, the image in question is video coded if a clear reading result has not been automatically ascertained within a prescribed time period, the automatic reading steps being optimized in an upstream adaptation phase using a random sample, comprising the images with the information to be read and the associated desired reading results with their intermediate result, characterized in that, during a reading mode, when information from selected images has been clearly read automatically, the reading results and intermediate results associated with the image data of the respective image are stored for a current random sample, and/or, when information from the selected images has been clearly ascertained using video coding, the image data are read once again in a second automatic reading process, having the same functionality, and the associated information ascertained by video coding is included, and in the case of a clear reading result, the reading results and intermediate results are likewise stored, assigned to the associated image data, for the current random sample, and in that the current random sample is used to readapt the automatic reader, and wherein the reading rate is ascertained on an automatic reader having the same functionality using a random sample in the case of the previous and the readapted parameters, and if the reading rate is improved by the readapted parameters, the automatic reader is reinitialized.

12. The method according to claim 11, wherein the reading process for the second automatic reading is carried out with no time limitations.

13. The method according to claim 11, further comprising the steps of determining unsuitable reading and intermediate results and excluding such results from the random sample.

14. The method according to claim 11, wherein, for each image read successfully using video coding, the intermediate results for the first automatic reading are compared with the associated intermediate results for the second automatic reading, and significant discrepancies are summed as evaluation errors in the respective intermediate steps during die first automatic reading to form a statistic.

15. The method according to claim 14, wherein only the intermediate steps whose ascertained frequency of error is above a stipulated value during a particular time period are readapted.

16. The method according to claim 11, wherein the reading rate for the first automatic reading is monitored, and if the reading rate is below a particular threshold value over a stipulated time period, the reader or the intermediate steps are readapted using the current random sample.

* * * * *